Patented June 19, 1951

2,557,803

UNITED STATES PATENT OFFICE 2,557,803

BIS-AMINO ALKYL SILOXANES AND THEIR HYDROCHLORIDES

Leo Harry Sommer, State College, Pa., assignor to Dow Corning Corporation, Midland, Mich., a corporation of Michigan No Drawing. Application April 13, 1950, Serial No. 155,785

4 Claims. (Cl. 260—448.2)

The present invention relates to bis-aminoalkyldisiloxanes, to their hydrochlorides, and to methods for their production.

Compounds in accordance herewith are of the general formula $O[Si(CH_3)_2(CH_2)_nNH_2(HCl)_s]_2$ in which $n$ has an average value of from 2 to 5, inclusive, and $s$ has a whole value of from 0 to 1, inclusive. The method in accordance herewith, which is particularly applicable to the preparation of the above-identified disiloxanes, involves the cleavage of a methyl or phenyl radical from a silicon atom. Thus, in accordance with the method hereof, an amine of the formula

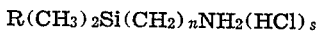

in which R represents methyl or phenyl, is reacted with concentrated sulfuric acid. The reaction proceeds to form a sulfate of the amine and to cleave the R radical, with the substitution of a sulfate radical therefor.

The silanes of the general formula

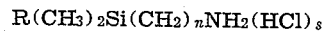

which are employed in the preparation of the products of the present invention may be obtained as follows:

In the following description of methods for the preparation of raw materials, the terms "triorganosilyl" and "triorganosilane" are employed to refer collectively to trimethylsilyl and phenyldimethylsilyl, and trimethylsilane and phenyldimethylsilane, respectively.

For the production of the amines employed in the method hereof, the omega-triorganosilyl-substituted propionic to hexoic acids are necessary intermediates. These acids may be prepared as follows:

For the preparation of the silyl-substituted propionic acid, chloromethyltrimethylsilane and chloromethyldimethylphenylsilane may be employed as raw materials. These two raw materials are described in the literature. These chloromethylsilanes may be subjected to the malonic ester synthesis, which is a general synthetic method known in organic chemistry. As applied to the present synthesis, the chloromethylsilane is reacted with an equivalent weight of the sodium salt of diethyl malonate. The reaction product is saponified, hydrolyzed, and decarboxylated, as is known in this type of synthesis. The product is the omega-triorganosilylpropionic acid.

To prepare the triorganosilylbutyric acid, the chloromethylsilanes may be reacted with an equivalent weight of magnesium in diethyl ether to prepare the Grignard reagent. This may be reacted with ethylene oxide. By this method there is obtained the omega-triorganosilylpropanol. This substituted propanol may be converted by reacting it with an equivalent weight of phosphorous tribromide to the omega-triorganosilylpropyl bromide. This substituted propyl bromide may be reacted with an equivalent weight of magnesium in diethyl ether to prepare the equivalent Grignard reagent. This Grignard reagent is then reacted with carbon dioxide, as by pouring it on solid carbon dioxide, to form a complex which upon hydrolysis with water yields the triorganosilylbutyric acid.

The triorganosilylvaleric acid may be prepared from the triorganosilylpropyl bromide prepared as above described. When the malonic ester synthesis above described is employed with this substituted propyl bromide, the triorganosilylvaleric acid is obtained.

The omega-triorganosilylhexoic acid may be prepared from the above-described triorganosilylpropyl bromide by preparing a Grignard reagent of this bromide and reacting this Grignard reagent with ethylene oxide. By this method the omega-substituted triorganosilylamyl alcohol is produced. This may be converted to the bromide by reacting it with an equivalent weight of thionyl bromide. A Grignard reagent is prepared from this substituted amyl bromide, which Grignard reagent is then reacted with carbon dioxide by the method above stated to yield a complex, which upon hydrolysis with water produces the omega-triorganosilylhexoic acid.

The above-described acids may be converted to the equivalent acyl halides by reacting them with an equivalent weight of any conventional halogenating agent, such as thionyl chloride, benzoyl chloride, phosphorous trichloride, or the corresponding bromides.

The acyl halides so prepared are reacted with liquid ammonia. Very vigorous reaction is obtained upon mixture of the ammonia and the acyl halide. Purely to suppress the reaction and avoid an unduly high rate of reaction in order to prevent loss of ammonia, it is desirable to conduct the reaction at low temperature, such as below 0° C. The reaction forms the ammonium halide as a by-product. The amide produced in accordance herewith preferably is separated from the ammonium halide. This may be effected by dissolving the amide in any conventional solvent in which amides are soluble and in which ammonium halides are insoluble, for example, diethyl ether. The amide may then be recovered from the solution.

In the preparation of the amines from the amides by the method in which the nitrile is an intermediate, the amide is first dehydrated. This dehydration may suitably be accomplished by heating the amide with phosphorous pentoxide. The nitrile so formed may be separated from the phosphorous acid, which is by-produced by distillation either at atmospheric pressure or under reduced pressure. Various methods are known for the reduction of nitriles. The use of lithium aluminum hydride is preferred, however. By this method the primary amines are formed. When lithium aluminum hydride is employed, a nitrogen metallic compound is produced, which may then be hydrolyzed with water to yield the desired amine.

In the Hofmann synthesis for amines from the amides, the amide of the formula $R'CONH_2$ is reacted with sodium metallate and bromine in methanol solution. The Hofmann synthesis is a degradation which by this reaction yields a urethane of the formula $R'NHCOOCH_3$. The urethane is then decomposed, as by alcoholic potassium hydroxide, to yield the amine of the formula $R'NH_2$, which will be present in alcoholic solution. When the above-described amides are employed, the amines produced are of the formula $R(CH_3)_2Si(CH_2)_nNH_2$. The alcohol may then be removed by distillation, leaving a purified amine hydrochloride.

As is well known in the chemistry of amines and their hydrochlorides, the hydrochloride may be prepared from the amine by reaction with hydrogen chloride. Likewise, the amine may be prepared from the hydrochloride by neutralizing the latter with a caustic alkali and distillation of the amine from the residual salt.

By reacting these omega-triorganosilylalkylamines with sulfuric acid as herebelow described and hydrolyzing the reaction product, the products of the present invention are obtained.

The process hereof may be applied both in connection with the amines and the amine hydrochlorides. When an amine is employed, the sulfuric acid forms an organosilane bisulfate or sulfate salt. The phenyl radical, or one methyl, if there are three methyl radicals on the silicon, is cleaved from the silicon. Sulfuric acid replaces the cleaved radical in the form of a bisulfate or sulfate radical. When an amine hydrochloride is employed, hydrobisulfate replaces the hydrochloride. After the formation of the bis-bisulfate, this intermediate is hydrolyzed, as with water, whereby upon condensation of the silanol, which occurs simultaneously with the hydrolysis, the disiloxane is obtained. The product at this time is a disiloxane of the general formula $O[Si(CH_3)_2(CH_2)_nNH_2OSO_3H]_2$. By neutralizing this bisulfate with alkali, the diamine is prepared, which may be removed from the salt, which is by-produced, by steam distillation. This diamine may then be converted to the hydrochloride corresponding thereto by reaction with hydrochloric acid.

By mixing various of the amine raw materials employed in the process hereof, products are obtained in which $n$ has a fractional value.

The products hereof are of utility as catalysts for the setting of polysiloxane resins which contain residual uncondensed hydroxyl radicals bonded to silicon atoms of the polysiloxane.

Example 1

The compound $O[Si(CH_3)_2(CH_2)_2NH_2]_2$ (I) and its hydrochloride, $$O[Si(CH_3)_2(CH_2)_2NH_2HCl]_2 \qquad (II)$$

were prepared as follows:

The sodium salt of diethyl malonate was prepared from sodium ethylate using 200 grams of sodium and from 790 grams of diethyl malonate. The alcoholic solution of the sodium salt was clear and yellow. This sodium salt was reacted with 514.5 grams of chloromethyltrimethylsilane, which was added gradually, with the reaction mixture being heated under reflux. This reaction product was saponified by the addition of 561 grams of potassium hydroxide dissolved in 570 cc. of water, the saponification being effected at room temperature, following which the reaction mixture was refluxed for two and one-half hours. Ethanol was removed by distillation. The potassium salt so formed was hydrolyzed by the addition of one liter of concentrated hydrochloric acid. The reaction mixture was stirred under reflux for five hours, whereby trimethylsilylpropionic acid was formed as an upper layer. This acid boils at 90.5° C. at a pressure of 37 mm. mercury and has a refractive index of $n_D^{20}$ equal to 1.4192.

The beta-trimethylsilylpropionic acid so prepared, in amount of 73 grams, was added gradually at room temperature to 89.3 grams of thionyl chloride. After one-half hour, when the addition was complete, the reaction mixture was heated to 83° C. and maintained at that temperature for three hours. Excess thionyl chloride was removed by flash distillation at 25° C. at a pressure of 4 mm. mercury. The reaction product, which was substantially entirely beta-trimethylsilylpropionyl chloride, was added to a solution of 50 grams of liquid ammonia in 50 cc. of diethyl ether at $-70°$ C. Vigorous reaction occurred, with the formation of ammonium chloride. An additional 150 cc. of ether was added to maintain the slurry in a fluid state. The temperature was raised to room temperature. The solution was removed from the salt by filtration, and the salt was washed with additional ether. The product was crystallized from the ethereal solution by concentrating the solution and then cooling. The trimethylsilylpropionamide product was obtained as transparent plate crystals which had a melting point of 92–93° C.

The methyl urethane of beta-trimethylsilylpropionamide was prepared by reacting 137 grams of said amide with a sodium methylate solution prepared from 540 cc. of anhydrous methanol and 40.5 grams of metallic sodium. Liquid bromine was then added gradually till the amount added was equal to 46 cc. The reaction mixture was heated under reflux for one and one-half hours, following which the reaction product was acidified with glacial acetic acid. The urethane derivative was fractionated to remove methanol, and the remaining material was extracted with ether. Fractionation of the ether extract yielded N-(beta-trimethylsilylethyl)-methyl carbamate which has a boiling point of 108° C. at a pressure of 12 mm. mercury and a refractive index of $n_D^{20}$ equal to 1.4410. This carbamate was hydrolyzed and decarboxylated by reacting it with 240 grams of potassium hydroxide in 400 cc. of methanol, the mixture being heated under reflux for fifteen hours. The methanol was removed by distillation. The remaining material, after removal of the methanol, was steam-distilled. The total distillates were acidified with hydrochloric acid and evaporated to dryness. The residue was beta-trimethylsilylethylamine hydrochloride, which has a melting point of 300° C. and is recrystallizable from a mixture of absolute alcohol and diethyl ether. The amine hydrochloride was neutralized in aqueous solution with an excess of potassium hydroxide over a mole per mole equivalent. The amine was extracted from the reaction mixture with ether and recovered by evaporation of ether from the extract. Beta-trimethylsilylethylamine was thereby obtained, which had a boiling point of 121° C. at atmospheric pressure and a refractive index of $n_D^{20}$ equal to 1.4244. In order to maintain the free amine, it should be held in the absence of carbon dioxide in order to prevent the formation of the carbamate.

A single methyl radical was cleaved from the silicon in the amine so prepared by mixing 100 cc. of concentrated sulfuric acid and 15.4 grams of beta-trimethylsilylethylamine hydrochloride at room temperature. Gas evolution started immediately, the gas being a mixture of methane and hydrogen chloride. When the gas evolution slowed down somewhat, the reaction mixture was heated at 100° C. until foaming stopped. The reaction mixture was poured onto 100 grams of ice, and the resulting solution was made strongly basic by the addition of a concentrated sodium hydroxide solution, whereby the bisulfate which had been formed was hydrolzed to form the silanol, which immediately condensed to the siloxane. The alkaline reaction mixture was distilled, whereby the distillate was a mixture of water and compound I. This distillate was acidified with concentrated hydrochloric acid and evaporated to dryness. Compound II was thereby obtained in the form of white needles, which compound has a melting point of 267-268 C.

Compound II was converted to compound I by adding a solution of 11.3 grams of potassium hydroxide in 100 cc. of methanol to 24.2 grams of compound II in 50 cc. of methanol. The salt which was formed was removed from the methanol solution of compound I by filtering. The methanol solution is fractionally distilled to obtain compound I, which has a boiling point of 115° C. at a pressure of 13 mm. mercury and a refractive index of $n_D^{20}$ equal to 1.4440.

That which is claimed is:

1. Compositions of the group consisting of disiloxanes of the general formula $$O[Si(CH_3)_2(CH_2)_nNH_2]_2$$

in which each $n$ has an average value of from 2 to 5, inclusive; and salts thereof.

2. $O[Si(CH_3)_2(CH_2)_2NH_2]_2$.

3. $O[Si(CH_3)_2(CH_2)_2NH_2HCl]_2$.

4. The method which comprises contacting a composition of the general formula $$R(CH_3)_2Si(CH_2)_nNH_2(HCl)_s$$

in which R represents a radical of the group consisting of methyl and phenyl, $n$ has an average value of from 2 to 5, inclusive, and $s$ has a whole value from 0 to 1, inclusive, with concentrated sulfuric acid, whereby the R radical is cleaved from the silicon and a sulfate ester of said silane is formed, hydrolyzing said silane ester and condensing the hydrolysis product whereby a disiloxane bisulfate is formed, and neutralizing the said bisulate, whereby there is obtained a composition of the general formula $$O[Si(CH_3)_2(CH_2)_nNH_2]_2$$

LEO HARRY SOMMER.

No references cited.